United States Patent [19]

Norkey

[11] Patent Number: 5,527,072
[45] Date of Patent: Jun. 18, 1996

[54] QUICK CONNECT COUPLING

[75] Inventor: Philip Norkey, Jackson, Mich.

[73] Assignee: Pilot Industries, Inc., Dexter, Mich.

[21] Appl. No.: 267,887

[22] Filed: Jun. 28, 1994

[51] Int. Cl.⁶ .................................................. F16L 37/084
[52] U.S. Cl. ............................ 285/319; 285/423; 285/921
[58] Field of Search .................................. 285/319, 423, 285/921, 320

[56] References Cited

U.S. PATENT DOCUMENTS

| | | | |
|---|---|---|---|
| 4,902,043 | 2/1990 | Zillig et al. | 285/319 |
| 4,948,180 | 8/1990 | Usui et al. | 285/319 |
| 4,997,216 | 3/1991 | Washizu | 285/319 |
| 5,100,182 | 3/1992 | Norkey | 285/321 |
| 5,112,084 | 5/1992 | Washizu | 285/319 |
| 5,161,833 | 11/1992 | McNaughton et al. | 285/319 |
| 5,310,226 | 5/1994 | Norkey | 285/316 |
| 5,324,080 | 6/1994 | McNaughton et al. | 285/319 |
| 5,401,063 | 3/1995 | Plosz | 285/319 |

FOREIGN PATENT DOCUMENTS

| | | | |
|---|---|---|---|
| 4296291 | 10/1992 | Japan | 285/81 |

*Primary Examiner*—Eric K. Nicholson
*Attorney, Agent, or Firm*—Gifford, Krass, Groh, Sprinkle, Patmore, Anderson & Citkowski

[57] ABSTRACT

A quick connect coupling is disclosed having a plastic housing with a first end, a second end and a throughbore extending between the ends of the housing. The housing also includes a radially inwardly extending abutment surface integrally formed with the housing around at least a portion of its first end. A fluid conduit defining a fluid passageway and open at one end is insertable into the first end of the housing so that the fluid passageway in the conduit registers with the housing throughbore. The fluid conduit also includes a radially outwardly extending bead formed circumferentially around the conduit at a position spaced from the open end of the conduit. Upon insertion of the conduit into the female housing, a metal retainer contained within the housing lockingly engages the conduit bead in order to secure the conduit and housing together. Fluid seals in the housing seal the housing and conduit together thus completing the fluid connection.

8 Claims, 2 Drawing Sheets

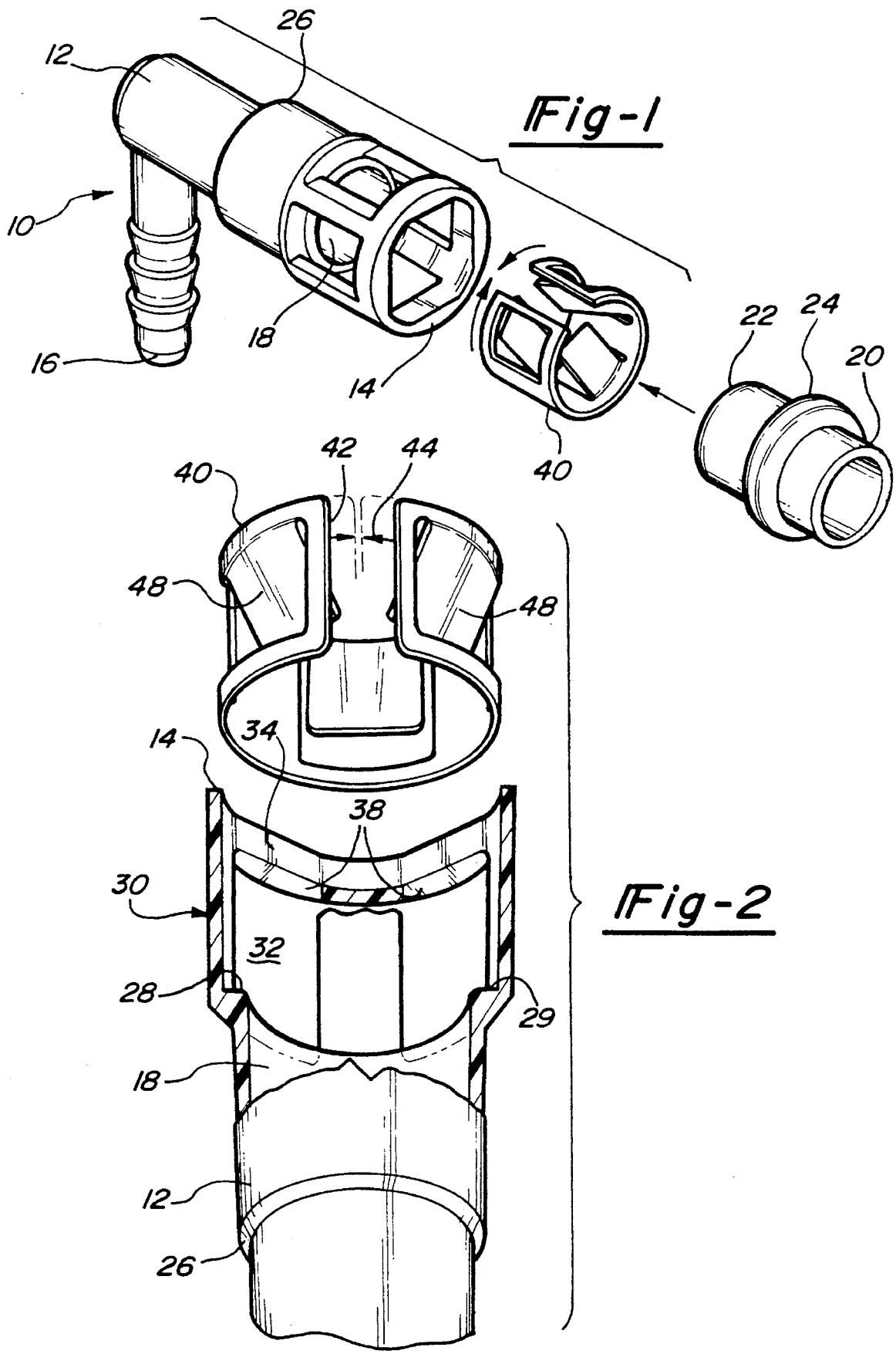

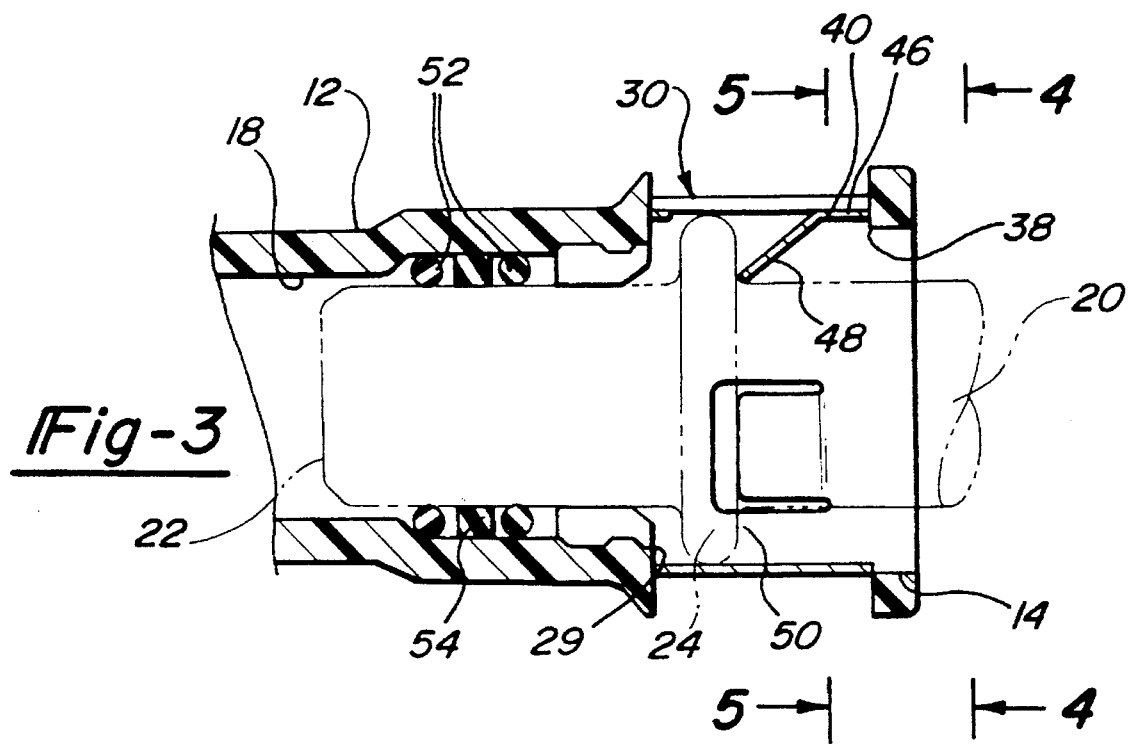
Fig-3
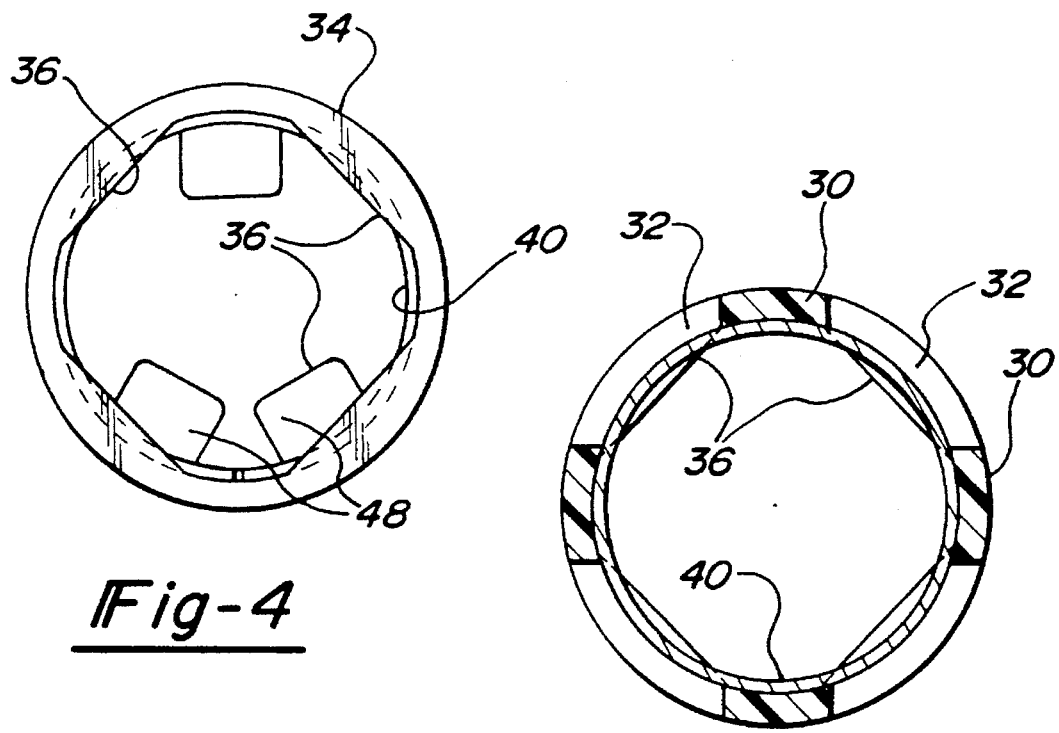
Fig-4
Fig-5

QUICK CONNECT COUPLING

BACKGROUND OF THE INVENTION

1. Field of the Invention

The present invention relates generally to fluid couplings and, more particularly, to a quick connect fluid coupling.

2. Description of the Prior Art

There are many previously known quick connect couplings of the type used in the automotive industry. Such quick connect couplings are, for example, typically employed in the fuel system for the automotive vehicle.

Many of these previously known quick connect couplings include a housing open at each end and having a throughbore extending between the ends of the housing. A retainer having inwardly extending tabs is then positioned within one end of the housing. A metal conduit having an outwardly extending bead formed circumferentially around the housing is then insertable into the first end of the housing until the locking tabs on the retainer engage one side of the conduit bead thus securing the housing and conduit together. In doing so, the fluid passageway formed through the conduit registers with the housing throughbore and completes the fluid connection.

For many of these previously known quick connect couplings, the housing was constructed of metal and had an enlarged diameter bore at a first end of the housing in which the retainer was positioned. In order to secure the retainer to the housing and thus prevent retraction of the retainer from the housing, the first end of the housing was typically rolled inwardly in order to form a radially inwardly extending annular abutment surface around the first end of the housing. The abutment between the retainer and the abutment surface prevented the retraction of the retainer from the housing.

While this previously known construction for quick connect couplings is effective in operation, the use of metal housings for the quick connect coupling increases the overall cost for the quick connect coupling and, for that reason, is disadvantageous.

Consequently, there have been a number of previously known quick connect couplings in which the female housing is constructed of plastic. Since it is not possible to roll plastic like metal, it is necessary to utilize other means in order to secure the retainer to the female housing. The previously known methods for securing the retainer to the female housing, however, have not proven entirely satisfactory in use.

In one type of previously known quick connect coupling, a molded plastic retainer is inserted into the female housing. The plastic retainer, furthermore, includes locking tabs which engage openings formed in the female housing in order to secure the retainer against retraction to the housing. This construction is disadvantages for several reasons. First, the plastic retainer, since it must be formed by molding, is relatively expensive to manufacture. Secondly, the plastic retainers are not as strong as the previously known metal retainers of the type used with metal female housings so that the fluid coupling exhibits a lower pullout resistance than the previously known couplings which use metal retainers.

Still further types of quick connect couplings which utilize plastic female housings utilize multipiece assemblies in order to secure the retainer to the housing which increases not only the complexity of the overall design but also the overall cost of the coupling.

There have been previously known quick connect couplings having a plastic housing and a metal retainer; my prior U.S. Pat. Nos. 5,056,756 and 5,054,743 disclose such connectors. In order to secure the retainer to the housing, it was necessary to both utilize a complex retainer shape and also angularly align or orient the retainer to the housing so that a port of the retainer was entrapped in a cut out formed in the housing. Both problems increased the cost of manufacture of the connector.

Although the use of a metal retainer with a plastic housing having annular abutment surface would eliminate many of the previously known problems of the plastic retainers, it has not been previously possible to mold a plastic female housing having an annular abutment surface necessary to retain a metal retainer. Such an annular abutment surface of the type previously formed by rolling one end of a metal housing is not possible for a plastic female housing since an "undercut", i.e. a continuous radially inwardly extending annular abutment surface, cannot be molded.

SUMMARY OF THE PRESENT INVENTION

The present invention provides a quick connect coupling which overcomes all of the above mentioned disadvantages of the previously known devices.

In brief, the quick connect coupling of the present invention comprises a plastic housing having a first end, a second end and a throughbore extending between the ends of the housing. An annular abutment surface is integrally formed with the housing around at least a portion of the first end of the housing throughbore.

In order to form the radial abutment surface without molding an "undercut", the housing of the present invention preferably includes a plurality of axially extending and circumferentially spaced webs around its first end. A ring then interconnects the outer end of each web so that a relatively straight segment of the ring extends between the ends of adjacent webs. These relatively straight or linear segments then form a discontinuous radially inwardly extending abutment surface which can be molded.

A tubular and cylindrical metal retainer is then inserted into the first end of the housing until one end of the retainer abuts against straight segments of the ring. In doing so, the ring secures the retainer in the housing against retraction. The retainer also includes a plurality of circumferentially spaced and radially inwardly extending locking tabs.

The quick connect coupling further comprises a fluid conduit having an outwardly extending bead formed circumferentially around it at a position spaced from one end. The fluid conduit is insertable into the female housing until the locking tabs engage the bead on the fluid conduit thus locking the fluid conduit and female housing together. In doing so, the fluid passageway through the fluid conduit fluidly communicates with the female housing throughbore thus completing the fluid connection. Appropriate fluid seals contained within the female housing sealingly engage the outer periphery of the conduit after insertion into the female housing in order to prevent leakage of the fluid coupling.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an exploded elevational view illustrating a preferred embodiment of the present invention;

FIG. 2 is an exploded partial sectional view illustrating a preferred embodiment of the present invention;

FIG. 3 is a fragmentary longitudinal sectional view illustrating the preferred embodiment of the invention;

FIG. 4 is a view taken along line 4—4 in FIG. 3; and

FIG. 5 is a view taken along line 5—5 in FIG. 3.

DETAILED DESCRIPTION OF A PREFERRED EMBODIMENT OF THE PRESENT INVENTION

With reference first to FIG. 1, a preferred embodiment of the quick connect coupling 10 of the present invention is thereshown and comprises a female housing 12 having a first end 14 and a second end 16. A throughbore 18 fluidly connects the ends 14 and 16 together.

The quick connect coupling 10 further comprises a tubular conduit 20 which is open at one end 22. The tubular conduit 20 also includes a radially outwardly extending bead 24 formed circumferentially around the conduit 20 at a position spaced axially from the end 22 of the conduit 20. In a fashion which will be subsequently described in greater detail, the end 22 of the conduit 20 is insertable into the end 14 of the female housing 12 in order to form the desired fluid connection.

With reference now particularly to FIGS. 2 and 3, the female housing 12 includes a main body portion 26 having an end 28 which terminates short of the end 14 of the female housing 12. A plurality of circumferentially spaced and axially extending webs 30 extend outwardly from the end 28 of the main body portion 26 so that an opening 32 is formed between each pair of adjacent webs 30. An annular abutment surface 29 is also formed at the junction of the webs 30 with the main body portion 26.

As best shown in FIGS. 2 and 4, a ring 34 extends circumferentially around and interconnects the ends of the web 30 distal from the end 28 of the main body portion 26. This ring 34 also forms the end 14 of the female housing 12.

As best shown in FIGS. 2, 4 and 5, the ring 34 includes a number of straight or linear segments 36 around its inner periphery. Furthermore, as best shown in FIG. 5, these straight segments 36 extend between the webs 30 and thus across the openings 32 formed between the webs 30. These linear segments 36 also form a discontinuous annular abutment surface 38 (FIG. 2) around an inside surface of the ring 34.

The main body portion 26, webs 30 and ring 34 are all of a one piece plastic construction. Furthermore, by providing the straight segments 36 of the ring 34 across the openings 32 formed through the female housing 12, the occurrence of an undercut is eliminated so that the female housing 12 can be molded and is preferably injection molded.

Referring now to FIGS. 2 and 3, the quick connect coupling 10 of the present invention further comprises a metal retainer 40 for securing the conduit 20 to the female housing 12. The retainer 40 is tubular and cylindrical in shape and is preferably constructed from spring steel. Furthermore, as best shown in FIG. 2, the retainer 40 includes a through slot 42 along one side which allows the metal retainer 40 to be selectively compressed, as indicated by arrows 44. Compression of the retainer 40 effectively reduces the diameter of the retainer 40 and allows the retainer 40 to be inserted through the ring 14 between the webs 30 to the position shown in FIG. 3. Upon release of the retainer 40, the retainer springs back to its original size and, in doing so, a portion 46 (FIG. 3) of the retainer 40 is positioned in abutment with the abutment surface 38 while the opposite end of the retainer 40 abuts against the abutment surface 29 thus preventing retraction of the retainer 40 from the female housing 12.

As best shown in FIGS. 2 and 4, the retainer 40 includes a plurality of circumferentially spaced locking tabs 48 which protrude radially inwardly into the housing throughbore 18.

With reference now to FIG. 3, upon insertion of the metal conduit 20 into the end 14 of the female housing 12, the metal conduit 20 together with its bead 24 deflects the locking tabs 48 radially outwardly thus permitting the bead 24 to be inserted past the locking tabs 48 to the position shown in FIG. 3. Once the bead 24 has been inserted to a position passed the locking tabs 48, the locking tabs 48 return to their radially inner position in which a free end of the locking tabs 48 engage a side 50 of the bead 24 distal from the end 22 of the conduit 20 thus locking the conduit 20 and female housing 12 together. Simultaneously, the fluid passageway formed by the conduit 20 registers with the throughbore 18 in the female housing 12 and completes the fluid connection.

Still referring to FIG. 3, at least one, and preferably two, fluid seals 52 separated by a bushing 54 are contained within the female housing 12. These fluid seals 52 engage the outer periphery of the fluid conduit 20 once the conduit 20 is inserted to the predetermined position illustrated in FIG. 3. In doing so, the fluid seals 52 fluidly seal the female housing 12 and conduit 20 together thereby preventing fluid leakage.

From the foregoing, it can be seen that the present invention provides a quick connect coupling utilizing a molded plastic housing as well as a metal retainer. The provision of the webs 30 together with the linear segments 36 of the ring 14 creates the desired annular abutment surface for the metal retainer 40 in order to retain the metal retainer 40 to the female housing 12 but without creating an unmoldable undercut in the female housing 12.

Having described my invention, however, many modifications thereto will become apparent to those skilled in the art to which it pertains without deviation from the spirit of the invention as defined by the scope of the appended claims.

I claim:

1. A quick connect coupling comprising:

a plastic housing having a first end and a second end and a throughbore extending between said ends of said housing, said housing having a radially inwardly extending abutment surface integrally formed around at least a portion of said first end of said throughbore, a fluid conduit defining a fluid passageway and open at one end, said open end of said fluid conduit being insertable into said first end of housing so that said fluid passageway registers with said housing throughbore, said fluid conduit having a radially outwardly extending bead formed circumferentially around said conduit at a position spaced from said open end of said conduit, means for fluidly sealing said conduit to said housing when said conduit is inserted into said housing to a predetermined position, means for locking said conduit and said housing together as said conduit is inserted to said predetermined position, said locking means comprising a tubular and cylindrical retainer insertable into said first end of said housing so that an end of said retainer abuts against said abutment surface and locks said retainer to said housing, said retainer having at least one radially inwardly locking tab which engages an end of said bead distal from said end of said conduit as said conduit is inserted to said predetermined position wherein said first end of said housing further comprises a plurality of circumferentially spaced and axially extending webs with an opening formed through said housing between each adjacent pair of webs, and a ring interconnecting an outer end of each web, wherein an inner periphery, of said ring comprises a plurality of interconnected linear segments so that said inner periphery of said ring forms said abutment surface.

2. The invention as defined in claim 1 wherein said retainer is made of metal.

3. The invention as defined in claim 2 wherein said retainer includes an axially extending opening formed on one side between the ends of said retainer, said retainer being insertable into said housing end by radially compressing said retainer and thereafter inserting the compressed retainer into said end of said housing.

4. The invention as defined in claim 1 wherein said retainer comprises a tubular and cylindrical band and wherein said tabs each comprise a stamping from said band.

5. The invention as defined in claim 1 wherein said housing, said webs and said ring are of a one piece construction.

6. The invention as defined in claim 1 wherein an end of each linear segment is aligned with one of said webs.

7. The invention as defined in claim 6 wherein said housing comprises a molded plastic housing.

8. The invention as defined in claim 1 wherein said sealing means comprises a bushing contained in said housing at a position spaced from said first end of the housing, said bushing resiliently engaging an outer periphery of said conduit as said conduit is moved to said predetermined position.

\* \* \* \* \*